United States Patent
Montani et al.

(10) Patent No.: US 8,353,795 B2
(45) Date of Patent: Jan. 15, 2013

(54) TWO-ARMED TENSIONER FOR THE DRIVE BELT OF A MOTOR VEHICLE

(75) Inventors: Andrea Montani, Chieti (IT); Alberto Ruffini, Chieti Scalo (IT)

(73) Assignee: Dayco Europe S.R.L., Chieti (IT)

( * ) Notice: Subject to any disclaimer, the term of this patent is extended or adjusted under 35 U.S.C. 154(b) by 252 days.

(21) Appl. No.: 10/575,506

(22) PCT Filed: Oct. 15, 2004

(86) PCT No.: PCT/EP2004/052561
§ 371 (c)(1),
(2), (4) Date: May 12, 2008

(87) PCT Pub. No.: WO2005/038297
PCT Pub. Date: Apr. 28, 2005

(65) Prior Publication Data
US 2008/0214342 A1    Sep. 4, 2008

(30) Foreign Application Priority Data
Oct. 17, 2003    (IT) .............................. TO2003A0819

(51) Int. Cl.
  *F16H 7/12*    (2006.01)
(52) U.S. Cl. .......................... 474/134; 474/135; 474/118
(58) Field of Classification Search .......... 474/133–135, 474/137
See application file for complete search history.

(56) References Cited

U.S. PATENT DOCUMENTS

| 4,416,647 | A |  | 11/1983 | White, Jr. |
| 4,758,208 | A |  | 7/1988 | Bartos et al. |
| 4,768,997 | A | * | 9/1988 | Page et al. .......... 474/84 |
| 6,167,686 | B1 | * | 1/2001 | Becker et al. .......... 56/17.3 |
| 2002/0039944 | A1 | * | 4/2002 | Ali et al. .......... 474/135 |
| 2003/0109342 | A1 |  | 6/2003 | Zamm et al. |
| 2003/0216203 | A1 | * | 11/2003 | Oliver et al. .......... 474/134 |

FOREIGN PATENT DOCUMENTS

| DE | 42 43 451 A1 | 6/1994 |
| DE | 4243451 A1 * | 6/1994 |
| DE | 199 26 612 A1 | 12/2000 |
| DE | 199 26 613 A1 | 12/2000 |
| DE | 199 26 647 A1 | 12/2000 |
| WO | WO 00/77422 A1 | 12/2000 |
| WO | WO 02/10615 A1 | 2/2002 |
| WO | WO 02/10615 A1 | 4/2002 |

* cited by examiner

*Primary Examiner* — Robert A Siconolfi
*Assistant Examiner* — Anna Momper
(74) *Attorney, Agent, or Firm* — Mitchell P. Brook; McKenna Long & Aldridge LLP

(57) ABSTRACT

Described herein is a tensioner for a belt of a drive of a motor vehicle, comprising: at least two idle pulleys designed to co-operate with respective belt runs of the belt; two arms bearing the pulleys; and elastic means acting at least indirectly on the arms for tensioning the belt, in which the arms are constrained to one another, and at least one of the arms is hinged to a first mobile axis.

4 Claims, 3 Drawing Sheets

TWO-ARMED TENSIONER FOR THE DRIVE BELT OF A MOTOR VEHICLE

TECHNICAL FIELD

The present invention relates to a tensioner for a belt drive, in particular for an internal-combustion engine.

BACKGROUND ART

As is known, the internal-combustion engine of a motor vehicle is connected via a belt drive to one or more auxiliary devices, such as, for example, an electric machine and a compressor of an air-conditioning system.

Known to the art are so-called "start-stop" systems, in which the electric machine is reversible, of the motor-alternator type, and is able to function both as an electric generator driven by the internal-combustion engine and as starting motor, which drives the internal-combustion engine. During operation of the drive according to these two modalities, the torque that is impressed on the drive changes sign during a transient in which the tensioned belt run and the slack belt run of the belt are reversed. In the drives of the type described above, the tensioning of the belt is entrusted to a two-armed tensioner designed to co-operate simultaneously with two distinct belt runs of the belt.

Two-armed tensioners are known which comprise a pair of substantially rectilinear arms, each having a first end pivoted on a common axis set within or without the closed path of the belt, and a second end bearing an idle pulley that co-operates with the back surface of the belt itself. Known two-armed tensioners further comprise a spring, which acts by bringing the arms closer to one another and exerting a tensioning force on the belt.

Known two-armed tensioners present some drawbacks, due to the criticality of the sizing of the spring, which is subjected to conditions of operation that vary within a very wide range of values and to the relative slowness of the response to the transient of reversal of the torque.

In particular, in the two modes of operation described, the pulleys are subject to translations, due to the reversal of the tensioned belt runs, which can reach high values especially when the belt has increased its own total length on account of the slackening that occurs typically in a belt towards the final stage of its service life.

Furthermore, the transient of reversal of the torque has a very short duration, and conventional two-armed tensioners tend to react to the swapping-round between the slack belt run and the tensioned belt run with a delay that causes temporary slipping and consequent damage to the belt.

DISCLOSURE OF INVENTION

The purpose of the present invention is to provide a belt tensioner suitable for a drive for a "start-stop" system which will be free from the drawbacks described above.

The purpose of the present invention is achieved thanks to a tensioner for a belt drive as defined in Claim 1.

BRIEF DESCRIPTION OF THE DRAWINGS

For a better understanding of the present invention, there is now described a preferred embodiment, purely by way of non-limiting example and with reference to the attached drawings, in which.

BEST MODE FOR CARRYING OUT THE INVENTION

Figure 1:
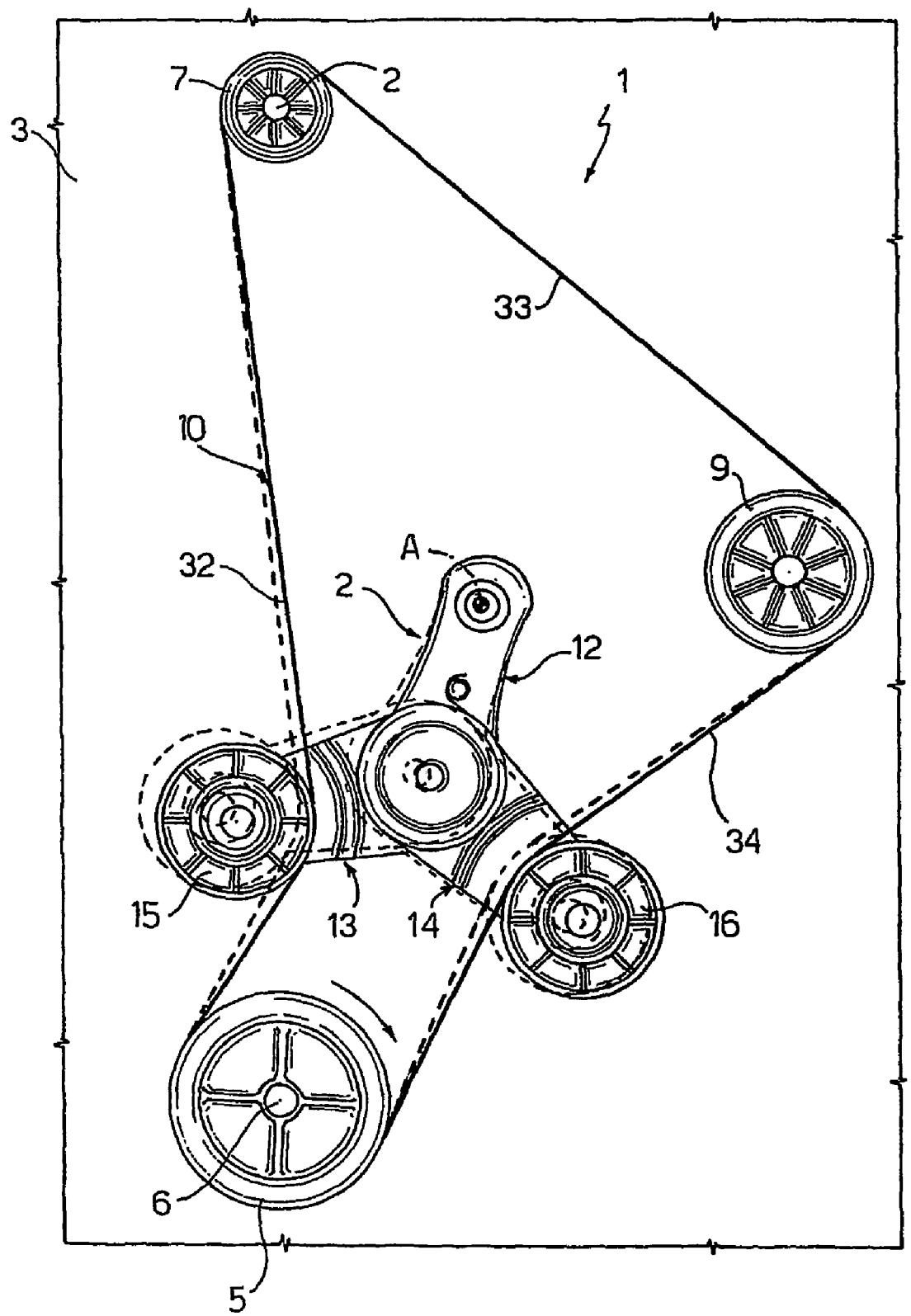
FIG. 1 illustrates a front view of a belt drive for an internal-combustion engine comprising a two-armed tensioner according to a first embodiment of the invention, in two positions of operation.

In FIG. 1, designated as a whole by 1 is a belt drive for the internal-combustion engine (not illustrated) of a motor vehicle, comprising: a two-armed tensioner 2 hinged on an external wall 3 of the engine; a first pulley 5 connected to an engine shaft 6 and arranged on the external wall 3; a second pulley 7 carried by an output shaft 8 of a motor-alternator (not illustrated) and by a third pulley 9 for driving an accessory (not illustrated either), for example a compressor of an air-conditioning system.

The drive 1 further comprises a belt 10, for example of the poly-V type, which runs over the pulleys 5, 7 and 9 and co-operates with the tensioner 2 forming a closed path, which has a first belt run 32 comprised between the first pulley 5 and the second pulley 7, a second belt run 33 comprised between the second pulley 7 and the third pulley 9, and a third belt run 34 comprised between the third pulley 9 and the first pulley 5.

The tensioner 2 comprises: a mobile element 12, which can, for example, rotate about a fixed axis A of a shaft coming out perpendicularly from the external wall 3; a pair of arms 13, 14 hinged to the mobile element 12; a pair of idle pulleys 15, 16, which are carried, respectively, by the arms 13, 14; and a spiral spring 17, which co-operates with the mobile element 12 and with one of the two arms, or else with both arms 13, 14, for loading the belt 10 and generating the tensioning force necessary for operation of the drive.

Figure 2:
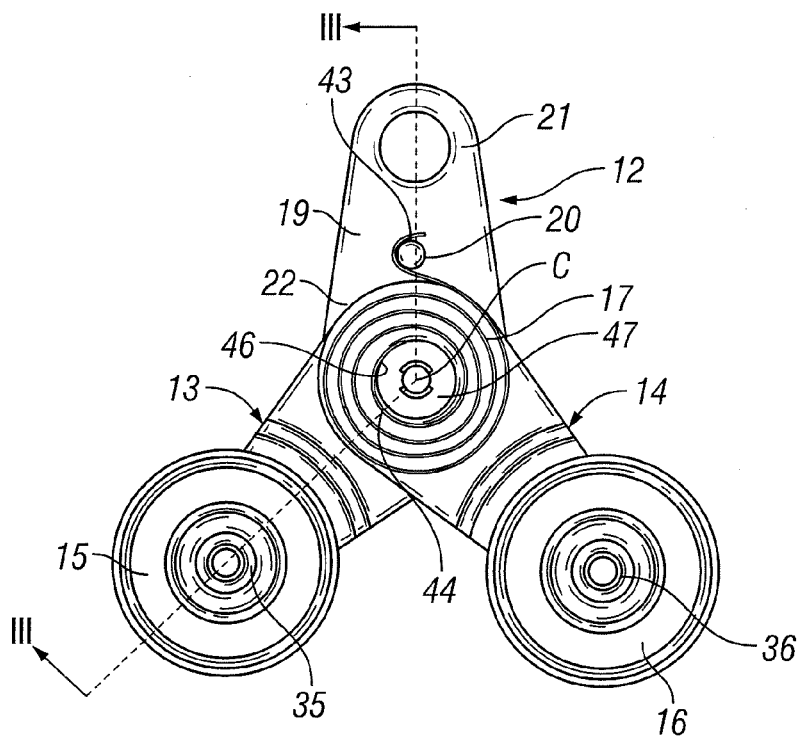
FIG. 2 illustrates a front view of the tensioner of FIG. 1 with parts removed for greater clarity.
Figure 3:
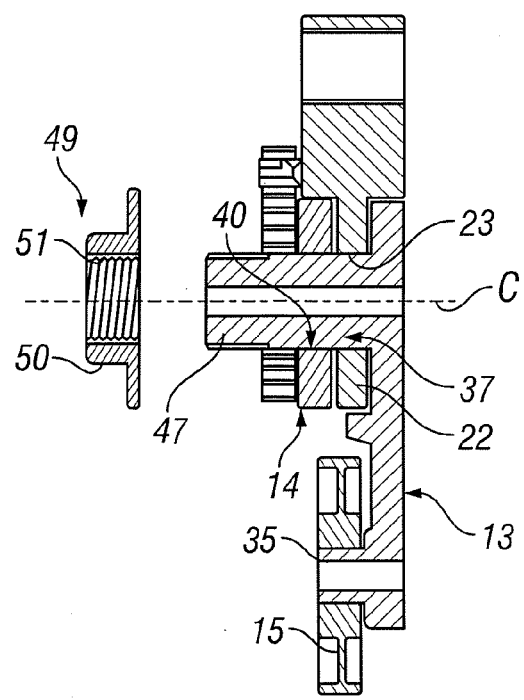
FIG. 3 illustrates a cross section of the tensioner of FIG. 1 according to the line III-III of FIG. 2.

In particular (FIG. 2), the mobile element 12 comprises integrally: a flat elongated body 19 having a projecting element 20 for constraining the spring 17; a first end portion 21 hinged about axis A; and a second end portion 22, which is opposite to the first one and has a through hole 23 with axis C parallel to the shaft of the fixed axis A.

The arm 13 comprises, at opposite ends, a device 35 for supporting the pulley 15, and a pin 37, which is coupled with the hole 23 for providing a hinge-type constraint.

The arm 14 comprises, at opposite ends, a device 36 for supporting the pulley 16, and a second through hole 40, which couples, in such a way that is free to rotate, to the pin 37, which extends beyond the mobile element 12 in the direction of the axis C.

According to the present configuration of assembly, the mobile element 12 is set between the arms 13, 14, the first one of which is in an internal position towards the wall 3, and the second one of which is in an external position towards the engine compartment.

In addition, wound about a threaded head portion 47 of the pin 37, which extends beyond the arm 14 in the direction of the axis C, is the spiral spring 17, which has a first peripheral end portion 43 constrained to the projecting element 20 and a second central end portion 44 constrained to a groove 46 parallel to the axis C of the shaft carried by the head portion 47.

The head portion 47 extends beyond the spring 17 in the direction of the axis C and is coupled to a protection device 49 for protection of the spring 17 from external agents. In particular, the protection device 49 comprises a lid or cover 50 having a threaded hole 51, which is coupled to the head portion 47.

Operation of the tensioner 2 is described in what follows.

In use, the configuration of the tensioner 2 is determined by the condition of equilibrium to rotation about the axis A of the action of the spring 17 and of the resultants R1, R2 of the tensile stresses T1, T2 exerted by the belt runs 32, 34 on the pulleys 15, 16 and, hence, on the respective arms 13, 14. Said resultants R1, R2 are proportional to the respective tensile stresses T1, T2 of the belt runs and are correlated to the winding angles of the belt 10 about the respective pulleys 15, 16.

In conditions of zero transmitted torque, and in particular with the engine turned off, the tensile stress on the belt 10 is uniform on all the belt runs, and the tensioner 2 is in the resting position illustrated as hatched in FIG. 1, given that the tensioning is determined by the action of the spring 17.

Given the direction of rotation of the engine shaft 6 in a clockwise direction as viewed in FIG. 1, as a torque transmitted by the engine 4 to the motor-alternator and/or to the accessory increases, the tension of the belt 10 in the belt run 34 ("tensioned" belt run) becomes greater than the tension of the belt run 32 ("slack" belt run). Consequently, the resultant R1 of the belt run 32 and the resultant R2 of the belt run 34, which are transmitted to the mobile element 12 via the respective arms 13, 14, are no longer balanced with respect to one another. In particular, the resultant R2 of the belt run 34 is greater than the resultant R1 of the belt run 32, and the arm 14 tends to draw along with it towards the tensioned belt run both the end of the mobile element 12 that carries the axis C and the arm 13. In this way, the tensioning action on the slack belt run exerted by the arm 13 is linked to the value of tensile stress T2 of the tensioned belt run.

When the value of the transmitted torque reaches a constant value, the action of the spring 17 and the new angles of winding about the pulleys 15, 16 caused by the displacement of the arms 13, 14 enable a new configuration of equilibrium to be achieved, which is maintained until the torque value changes subsequently.

The tensioner functions in a similar way also in the starting transients, in which the motor-alternator functions as electric motor and drives the internal-combustion engine. In this case, the direction of the torque is reversed, i.e., the belt run 32 becomes the tensioned belt run, and the belt run 34 becomes the slack belt run, and the arm 13 tends to draw the arm 14 along with it.

From an examination of the characteristics of the tensioner 2 obtained according to the present invention, the advantages that it enables are evident.

In particular, the large displacements caused by the reversal of the tensioned belt runs bring about the rigid translation of the two arms 13, 14 and exert a marginal stress on the spring 17 because this is carried by the mobile element 12. In this way, the spring 17 is substantially subjected to the relative displacements between the arms 13, 14, which have an oscillating component of smaller amplitude than the one calculated with respect to a fixed point on the wall of the engine, and this facilitates its sizing.

Furthermore, the fact that the arm that co-operates with the slack belt run will be driven directly by the arm that co-operates with the tensioned belt run renders the dynamic behaviour more prompt.

Finally, the position of the spring with respect to the pulleys is close, enabling a smaller length of the arms and a consequent greater effectiveness of the action of the spring on the belt.

Finally, it is clear that modifications and variations may be made to the tensioner 2 described and illustrated herein, without thereby departing from the sphere of protection of the present invention, as defined in the annexed claims.

Figure 4:
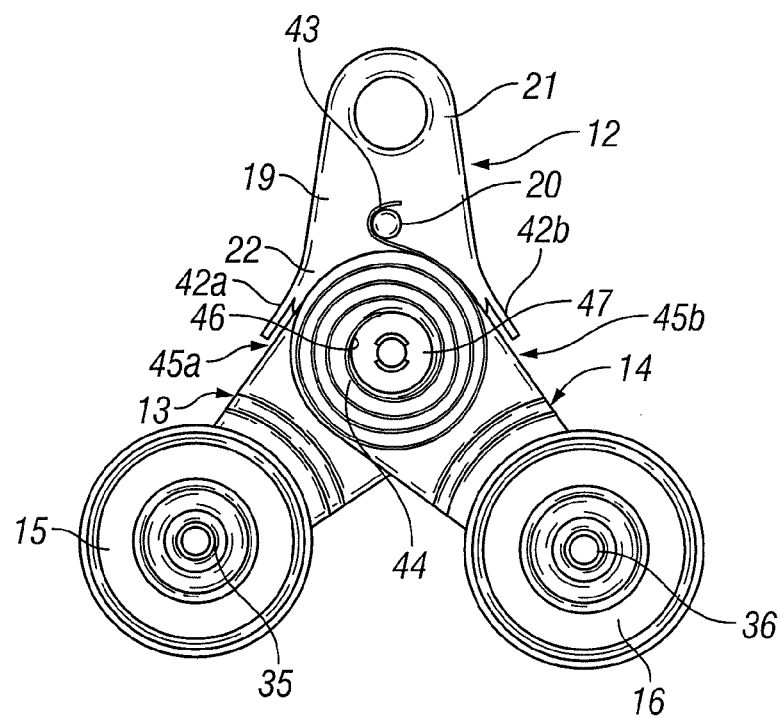
FIGS. 4 and 5 illustrate respective front views of tensioners according to alternative embodiments of the present invention.

In particular, according to an alternative embodiment (FIG. 4), the mobile element 12 comprises respective contrast walls 42a, 42b co-operating with respective external sides 45a, 45b of the respective arms 13, 14 in order to limit opening of the arms with respect to one another.

Figure 5:
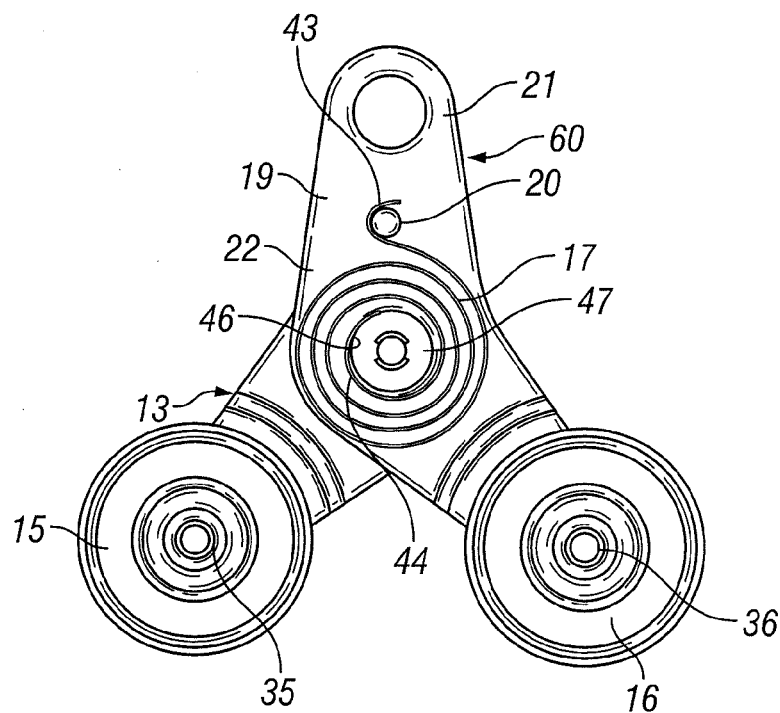

In addition, according to an alternative embodiment (FIG. 5), one of the two arms 13, 14, for example the arm 14, and the mobile element 12 are rigidly connected to one another to form an integral element 60, which carries the pulley 16 and is hinged to the axis A. The arm 13 is, in turn, hinged about the axis C, which is carried by the integral element 60.

The invention claimed is:

1. A tensioner for a belt of a drive of a motor vehicle, comprising:
   a first and a second idle pulleys designed to co-operate with respective belt runs of said belt;
   a first arm bearing said first idle pulley, said first arm being hinged about a mobile axis;
   a second arm hinged to said first arm about the mobile axis and bearing said second pulley, said first and second arms being rotatable relative to each other about the mobile axis;
   elastic means secured to a mobile element, the elastic means acting directly on one of said first and second arms and indirectly on the other of said first and second arms for tensioning said belt;
   the mobile element being distinct from said first and second arm and mobile during operation, said mobile axis being substantially perpendicular to and carried by said mobile element, said mobile element changing positions in reaction to changes in tensioning action on the belt runs, said positions being determined by an equilibrium caused by said changes in tensioning action; and
   arrest elements on said mobile element, said arrest elements co-operating with said arms for limiting opening of said arms with respect to one another.

2. The tensioner according to claim 1, characterized in that said mobile element is hinged about a fixed axis.

3. The tensioner according to claim 1, characterized in that said elastic means co-operate with one of said aims and with said mobile element.

4. A belt drive tensioner comprising:
   first and second pulleys operating with a belt running over the pulleys;
   a mobile element including a first end portion rotatable about a fixed axis at a hinge and a second end portion opposite to the first end portion;
   a first arm rotatably coupled to said mobile element about a mobile axis, said first pulley being mounted on the first arm;
   a second arm rotatably coupled to said first arm and to said mobile element about the mobile axis, said second pulley being mounted on the second arm;
   elastic means secured to the mobile element, the elastic means acting directly on one of said first and second arms and indirectly on the other of said first and second arms to generate a tensioning force; and arrest elements on said mobile element, said arrest elements co-operating with said arms for limiting opening of said arms with respect to one another;

said mobile element changing positions in reaction to changes in tensioning action on the belt, said positions being determined by an equilibrium caused by said changes in tensioning action.

* * * * *